United States Patent
Szazdi, Jr.

(10) Patent No.: US 10,640,299 B1
(45) Date of Patent: May 5, 2020

(54) WEAR INDICATOR FOR SPROCKET TIP

(71) Applicant: Flexicon Corporation, Bethlehem, PA (US)

(72) Inventor: John Stephen Szazdi, Jr., Northampton, PA (US)

(73) Assignee: FLEXICON CORPORATION, Bethlehem, PA (US)

( * ) Notice: Subject to any disclaimer, the term of this patent is extended or adjusted under 35 U.S.C. 154(b) by 0 days.

(21) Appl. No.: 16/386,713

(22) Filed: Apr. 17, 2019

(51) Int. Cl.
| | |
|---|---|
| B65G 23/24 | (2006.01) |
| F16H 55/30 | (2006.01) |
| F16H 57/01 | (2012.01) |
| B65G 43/00 | (2006.01) |
| F16H 55/12 | (2006.01) |

(52) U.S. Cl.
CPC ............ B65G 43/00 (2013.01); B65G 23/24 (2013.01); F16H 55/12 (2013.01); F16H 55/30 (2013.01); F16H 57/01 (2013.01); *F16H 2057/012* (2013.01)

(58) Field of Classification Search
None
See application file for complete search history.

(56) References Cited

U.S. PATENT DOCUMENTS

| | | | |
|---|---|---|---|
| 4,185,391 A | 1/1980 | Roley | |
| 4,472,164 A | 9/1984 | Pusch et al. | |
| 4,776,826 A | 10/1988 | Scott | |
| 5,203,861 A | 4/1993 | Irwin et al. | |
| 5,348,515 A * | 9/1994 | Miller | B62D 55/12 474/152 |
| 6,071,204 A | 6/2000 | Jefferies et al. | |
| 6,415,735 B1 | 7/2002 | Rogers | |
| 6,428,437 B1 | 8/2002 | Schlanger | |
| 7,018,313 B2 * | 3/2006 | Nakamura | F16H 55/30 474/152 |
| 7,967,709 B2 | 6/2011 | Emura et al. | |
| 9,121,697 B2 * | 9/2015 | Marumoto | G01B 21/20 |
| 9,581,231 B2 | 2/2017 | Pfeiffer | |
| 2003/0195072 A1 | 10/2003 | Redmond | |
| 2003/0199351 A1 | 10/2003 | Nichols | |
| 2005/0020392 A1 | 1/2005 | Redmond | |
| 2007/0058854 A1 | 3/2007 | Caskey et al. | |
| 2007/0149333 A1 | 6/2007 | Endo | |
| 2008/0261738 A1 | 10/2008 | Stout | |
| 2011/0138951 A1 | 6/2011 | Mashue et al. | |
| 2011/0284347 A1 | 11/2011 | Maclachlan et al. | |
| 2015/0114758 A1 | 4/2015 | Casals Terre et al. | |

(Continued)

OTHER PUBLICATIONS

Cablevey—"Tubular Cable Conveyor 6000 Series"—Website accessed via web archiving service (https://web.archive.org/web/20151030022215/http://cablevey.com/tubular-cable-conveyor-6000/) (Oct. 30, 2015) (enhanced figures and photograph of commercial product also enclosed).

(Continued)

*Primary Examiner* — Kavel Singh
(74) *Attorney, Agent, or Firm* — Volpe and Koenig, P.C.

(57) ABSTRACT

A sprocket tip for a sprocket assembly is disclosed. The sprocket tip includes a body defining at least one circumferential end face forming an engagement face configured to drivingly engage a traction system. A void is defined on an internal face of the body defined on an underside of the at least one circumferential end face.

19 Claims, 9 Drawing Sheets

(56) References Cited

U.S. PATENT DOCUMENTS

| | | |
|---|---|---|
| 2016/0003339 A1 | 1/2016 | Roberts, III et al. |
| 2016/0003340 A1 | 1/2016 | Crump et al. |
| 2017/0101159 A1 | 4/2017 | Watarai et al. |
| 2017/0241536 A1 | 8/2017 | Lintunen |
| 2017/0356540 A1 | 12/2017 | Feuerborn et al. |
| 2018/0274648 A1 | 9/2018 | Feuerborn et al. |

OTHER PUBLICATIONS

RUD—"RUD Conveyor Systems" Catalogue; (accessed via https://www.rud.com/fileadmin/user_upload/RUD_Group/RUD_FA_Relaunch/Downloads/Catalogue_conveyor-system_EN.pdf) (pp. 18-20; 47) (Nov. 2018).

* cited by examiner

WEAR INDICATOR FOR SPROCKET TIP

FIELD OF INVENTION

The present disclosure is directed to a sprocket tip, and is more particularly related to a sprocket tip for a bulk material conveying assembly.

BACKGROUND

Drag conveyors or cable conveyors are known and generally include an outer tube through which a cable, chain or other traction element is drawn. Discs are attached to the traction element at periodic intervals. By moving the traction element in a transport direction, granular material that is fed through an opening in the tube into spaces between discs is carried forward through the tube to an unloading point so that the granular material can be discharged.

Known conveyor systems typically include one driving sprocket and one tensioning sprocket, with optional intermediate sprockets, that are rotationally driven to engage the discs arranged on the traction element to pull the traction element continuously. These sprockets typically have sprocket arms that defined disc-engaging surfaces for driving the traction element. The sprocket arms can become overly worn or experience loads that result in the disc-engaging surfaces wearing down and failing. Catastrophic failure can occur if worn sprocket tips are continuously used, which can damage the sprockets, traction element, or conveying discs.

Known methods for protecting against overly worn sprocket tips require personnel to manually inspect the sprocket tips. Removal and inspection of the sprocket tips can be required to fully assess the wear condition of the sprocket tips. These inspection methods are time consuming and require downtime, which is undesirable.

Existing wear indicator arrangements are disclosed in U.S. Pat. Nos. 4,185,391; 4,776,826; 5,348,515; and 6,415,735; as well as U.S. Pub. 2017/0241536.

It would be desirable to provide a wear indicator for a sprocket tip that is easily detectable, either by personnel or sensing equipment, and provides a reliable indication of the wear condition of the sprocket tip.

SUMMARY

A sprocket tip for a sprocket assembly is disclosed. The sprocket tip includes a body defining at least one circumferential end face defining an engagement face configured to drivingly engage a traction system. A void is defined on an internal face of the body defined on an underside of the at least one circumferential end face.

The sprocket tip defines a channel configured to receive a traction element. In a worn condition of the sprocket tip, the engagement face is worn and the void is exposed. A thickness of the body at a location of the void can be 10%-50% of a thickness of the at least one circumferential end face away from the void.

In one embodiment, a sensor is arranged adjacent to the sprocket tip, and the sensor is configured to detect the void being exposed.

In one embodiment, the sprocket tip body is formed from two identical sprocket tip halves, and each sprocket tip half of the sprocket tip halves partially forms the void.

In one embodiment, the sprocket tip is connected to a sprocket arm.

The void can be positioned radially inward from the channel. In one embodiment, the void has a tapered cylindrical profile.

A method of detecting a wear condition of a sprocket tip is also disclosed. The method includes providing a sprocket assembly having at least one sprocket tip including: a body defining at least one circumferential end face defining an engagement face configured to drivingly engage a traction system, and a void defined on an internal face of the body on an underside of the at least one circumferential end face. The method includes monitoring a wear condition of the engagement face of the at least one sprocket tip via a sensor positioned adjacent to the at least one sprocket tip. The method includes generating a signal when the sensor detects the void is exposed.

These features can be used either alone or in various combinations with one another in order to provide the drag conveyor system in accordance with the invention.

BRIEF DESCRIPTION OF THE DRAWINGS

The foregoing Summary as well as the following Detailed Description will be readily understood in conjunction with the appended drawings which illustrate preferred embodiments of the invention. In the drawings.

DETAILED DESCRIPTION OF THE PREFERRED EMBODIMENTS

Certain terminology is used in the following description for convenience only and is not considered limiting. The words "right," "left," "lower" and "upper" designate directions in the drawings to which reference is made. This terminology includes the words specifically noted above, derivatives thereof and words of similar import. Additionally, the terms "a" and "one" are defined as including one or more of the referenced items unless specifically noted. As used herein, "traction element" refers to a cable, chain, belt, or other flexible element that can be drawn through a tube to provide a form of motion generation for the discs. As used herein, "traction system" refers to a cable including a plurality of flights, including conveying discs, a chain consisting of a plurality of links, or any other flexible element being driven by a sprocket arrangement.

Figure 1:
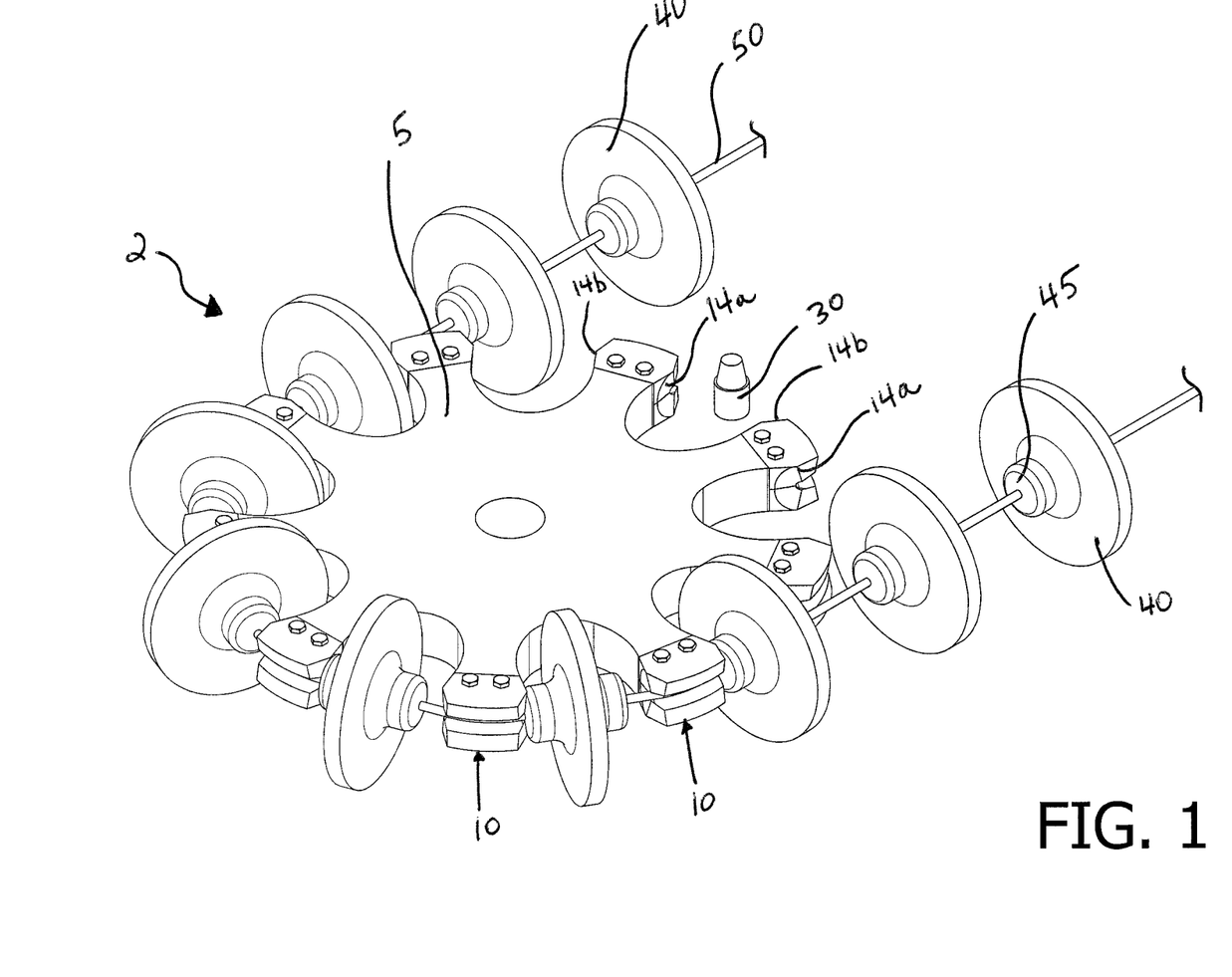
FIG. 1 is a perspective view of a sprocket assembly engaging a traction system.

As shown in FIG. 1, a sprocket tip 10 for a sprocket assembly 2 is disclosed. The sprocket assembly 2 includes a plurality of sprocket tips 10 each arranged on a sprocket 5. One of ordinary skill in the art would understand that the sprocket tip 10 can be connected or attached to the sprocket 5 according to a variety of methods and configurations. For example, the sprocket tips 10 can be fastened to the sprocket 5 via fasteners or any other mechanical coupling. In another embodiment, an adhesive can be used to attach the sprocket tips 10 to the sprocket 5. The sprocket tips 10 are preferably attached to the sprocket 5 via a removable connection, so that worn sprocket tips 10 can easily be replaced with new sprocket tips 10. The sprocket tip 10 defines a channel 11 configured to receive a traction element 50.

Figure 2A:
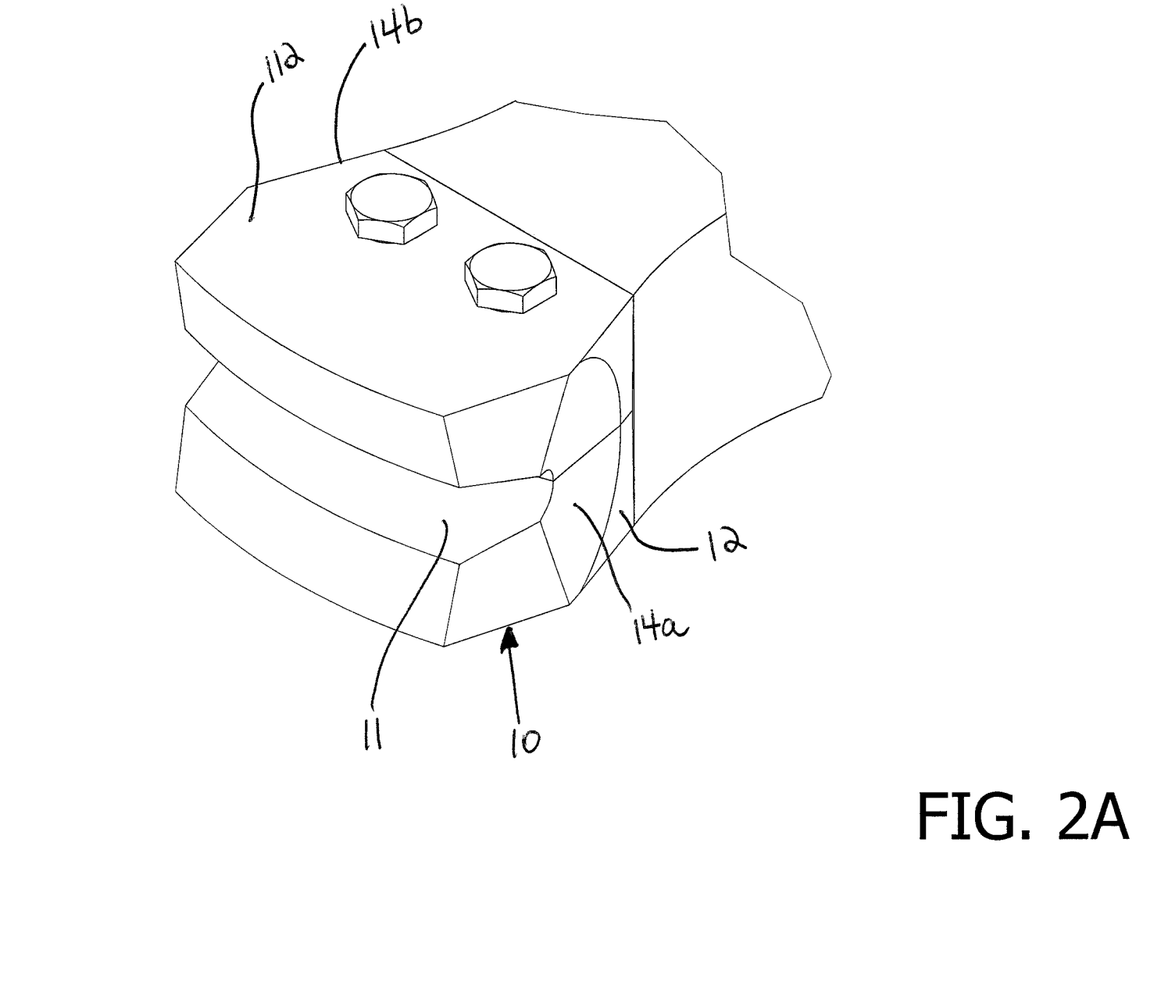
FIG. 2A is a perspective view of the sprocket tip of FIG. 1 in an initial condition.
Figure 2B:
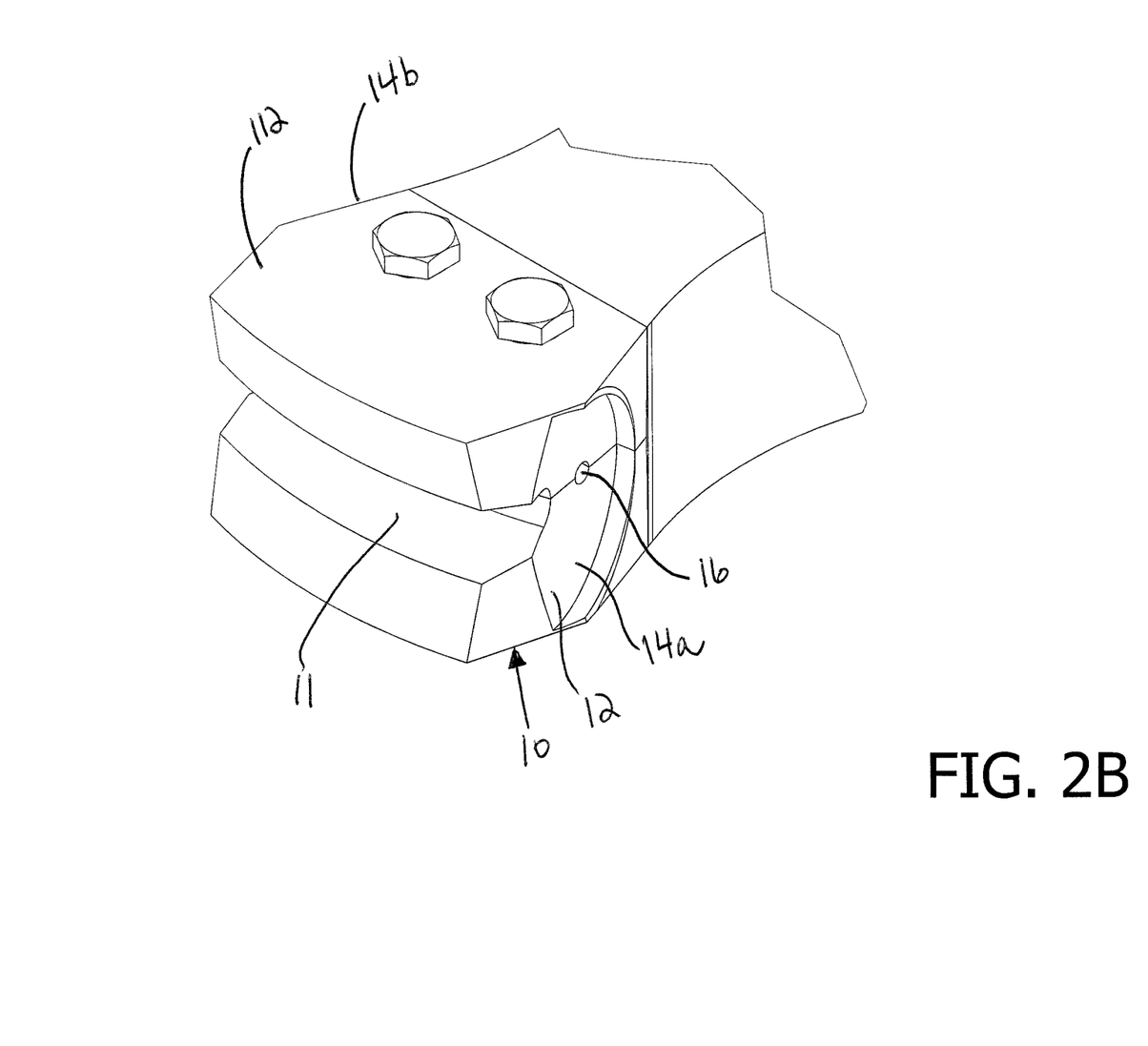
FIG. 2B is a perspective view of the sprocket tip of FIG. 2A in a worn condition.
Figure 3:
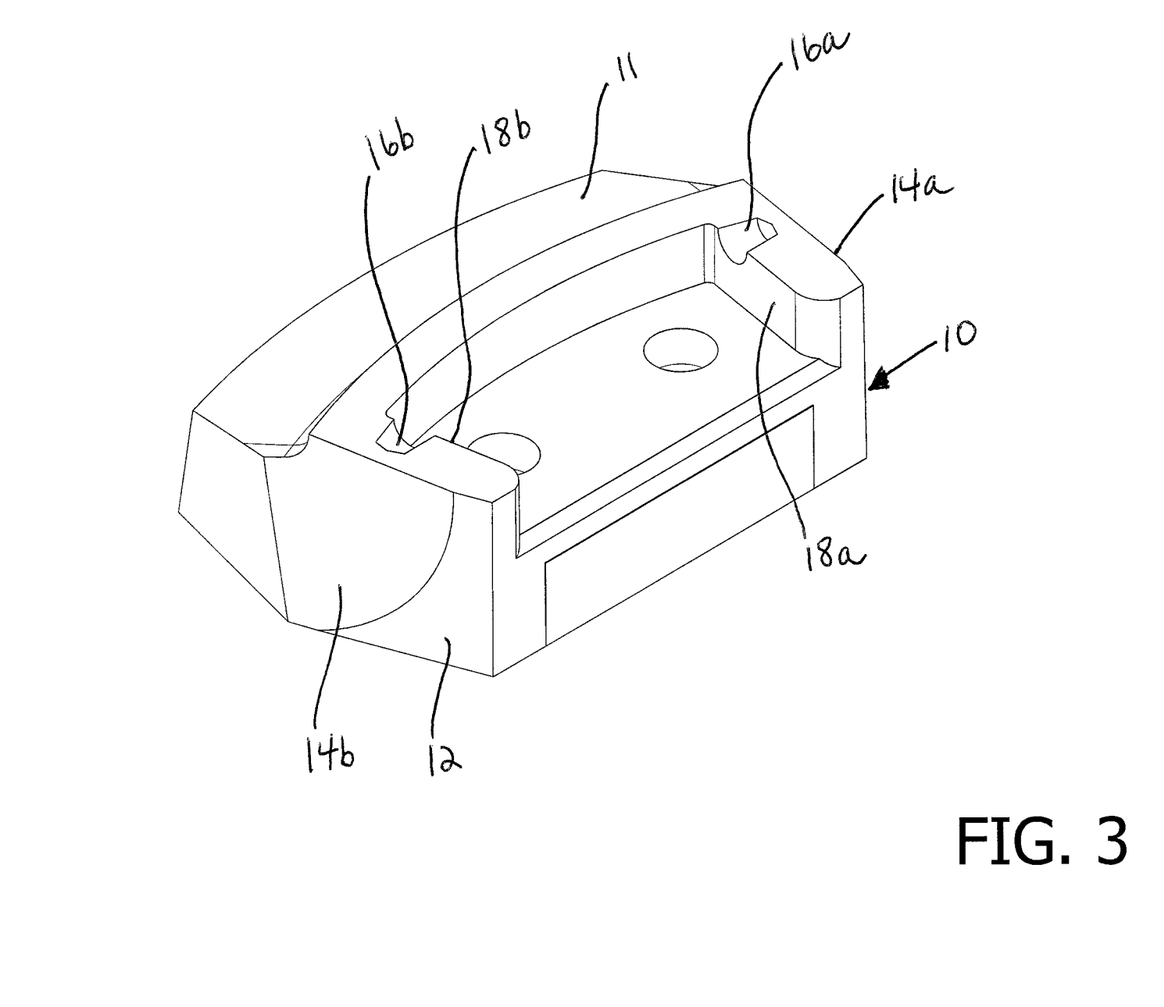
FIG. 3 is a perspective view of a sprocket tip half.
Figure 5A:
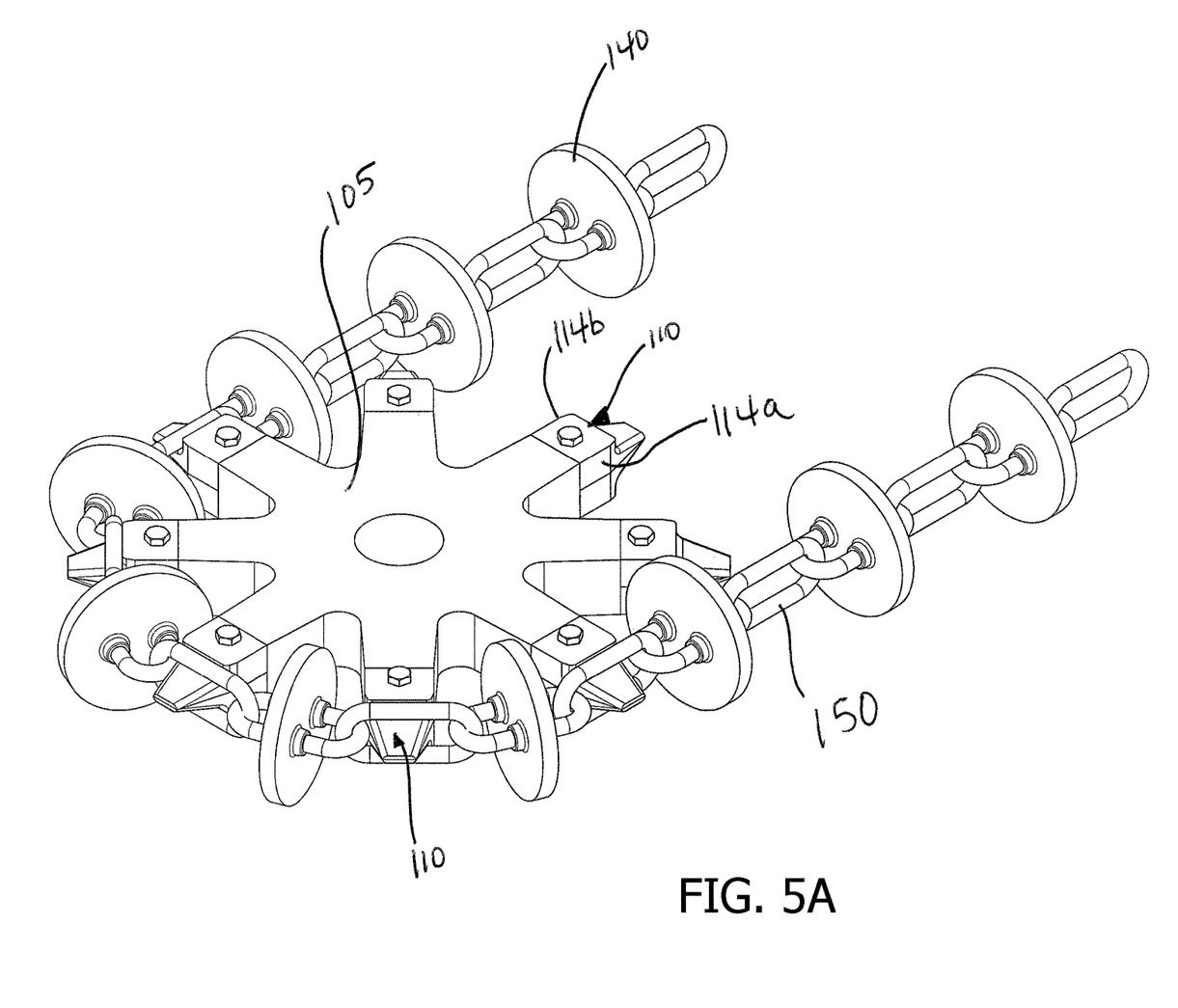
FIGS. 5A-5D illustrate an alternative embodiment of a sprocket assembly.
Figure 5B:
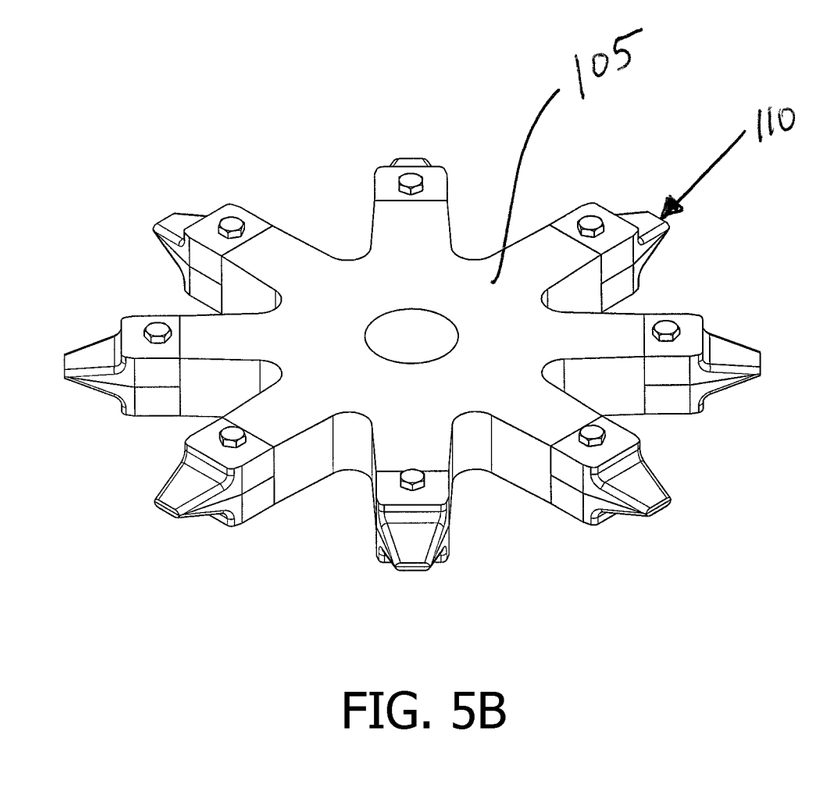
Figure 5C:
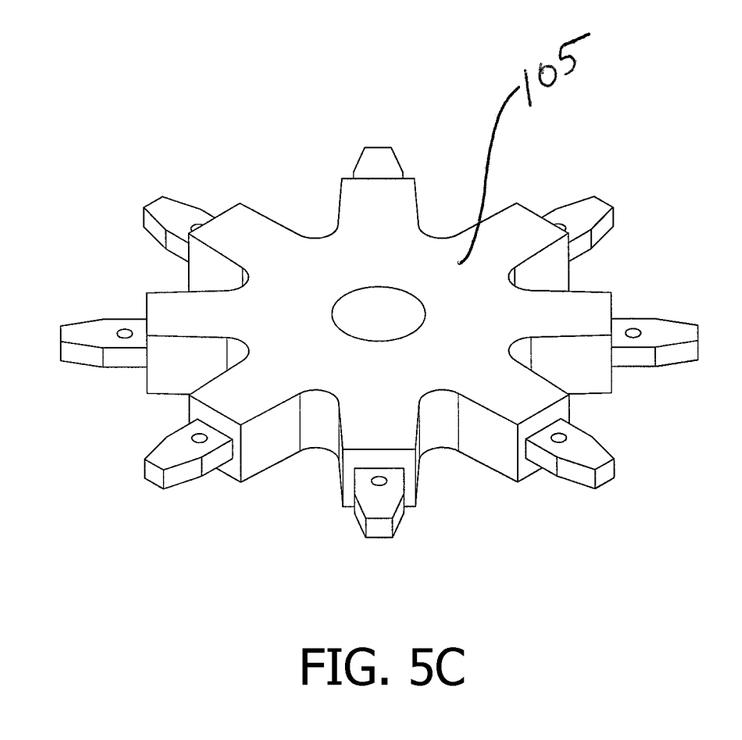

As shown in more detail in FIGS. 2A and 2B, the sprocket tip 10 includes a body 12, 112 defining at least one circumferential end face 14a, 14b defining an engagement face configured to drivingly engage a traction system. As shown in FIGS. 2A and 2B, and FIG. 5A, respectively, the traction system can include flights 45 arranged on a traction element 50 (such as a cable) or links forming a chain 150.

The term flights 45 is used broadly herein to refer to conveying discs 40 and/or underlying links for connecting the conveying discs 40 to the traction element 50. One of ordinary skill in the art would understand that any type of conveying element attached to the traction element 50 can engage the sprocket tips 10.

In one embodiment, the traction element itself, such as chain 150 can engage the sprocket tips 10. As shown in FIG. 5A, the chain 150 is provided that includes conveying discs 140. All other features of the embodiment of FIGS. 5A-5D are identical to the embodiment disclosed in FIGS. 1-4.

A wear indicator is provided in the form of a void 16, 16a, 16b. The void 16, 16a, 16b is defined on an internal face 18a, 18b of the body 12, 112 and is defined on an underside of the at least one circumferential end face 14a, 14b. As used herein, the term underside means a side facing away from the circumferential end faces 14a, 14b. The void 16, 16a, 16b is defined away from the engagement face of the sprocket tip 10 such that the void 16, 16a, 16b does not directly engage with the traction system. The void 16, 16a, 16b can be formed as part of a molding process for forming the sprocket tip 10 or can be formed via a drilling, boring, or punching process.

As the engagement face on the circumferential end faces 14a, 14b wears down due to repeatedly engaging the traction system, the void 16, 16a, 16b will become exposed, as shown in FIG. 2B. As used herein, the term "exposed" with respect to the void 16, 16a, 16b means that a through hole is defined through the body 12, 112 and the void 16, 16a, 16b becomes visible when looking at the outer surface of the sprocket tip 10. In other words, an outwardly facing portion of the body 12, 112 is worn down to expose the void 16, 16a, 16b.

As shown in FIG. 1, a sensor 30 is arranged adjacent to the sprocket tip 10 and the sensor 30 is configured to detect the void 16, 16a, 16b being exposed. The sensor 30 is configured to detect when the engagement face defined by the circumferential end faces 14a, 14b of the body 12 is worn down to expose the void 16, 16a, 16b.

The sensor 30 can include a processor, central processing unit (CPU), memory unit, power input, driver circuitry, and/or user interface. The sensor 30 can include any known type of sensor, including an optical sensor, break beam sensor, light sensor, or any other type of sensor. The sensor 30 can provide an audible alarm, visible indicator (e.g. via a display), or any other type of indicia that the void 16, 16a, 16b is exposed.

In one embodiment, the void 16, 16a, 16b is positioned radially inward from the channel 11. In one embodiment, the void 16, 16a, 16b has a generally cylindrical and tapered profile. One of ordinary skill in the art would understand based on the present disclosure that the profile and the position of the void 16, 16a, 16b can be varied depending on the requirements of a specific sprocket application.

Figure 4:
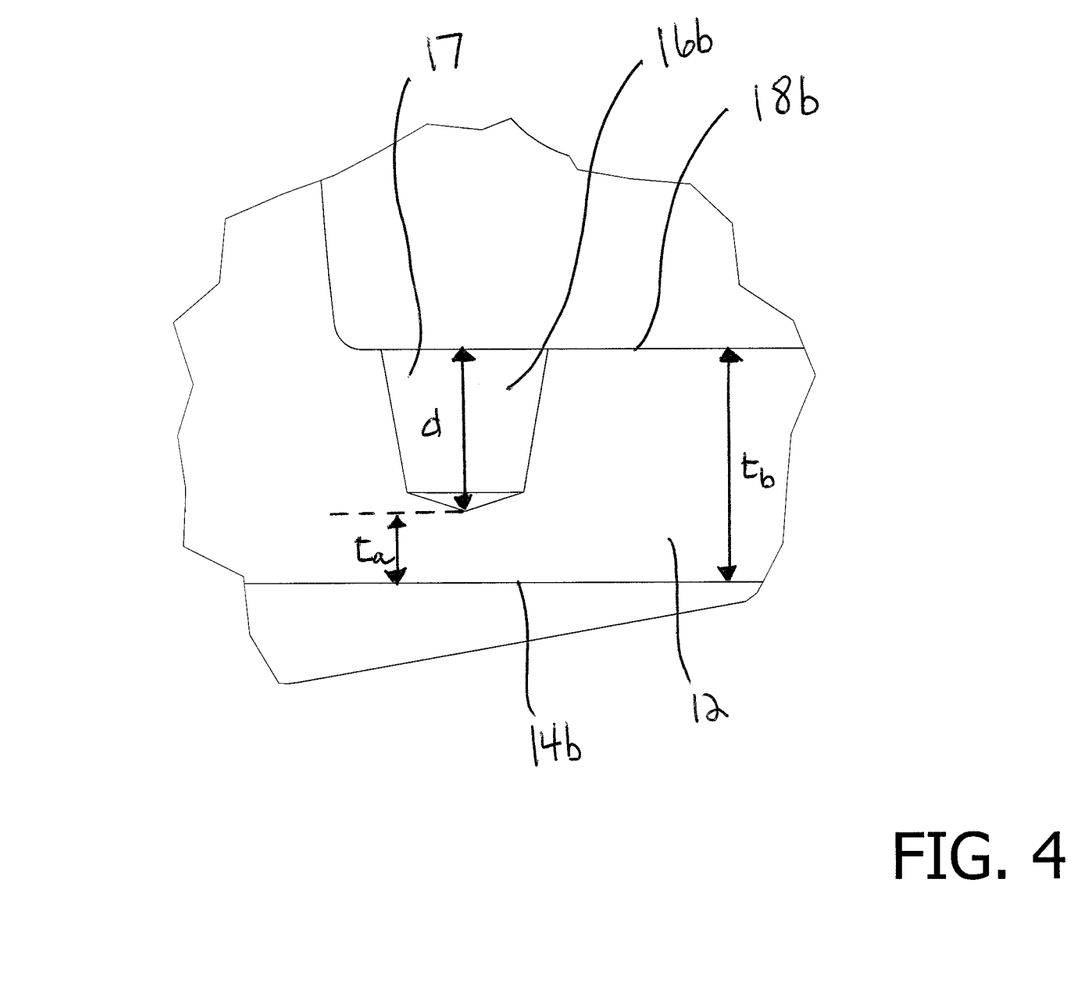
FIG. 4 is a magnified view of a body of the sprocket tip of FIG. 2A.

As shown in FIG. 4, a thickness ($t_a$) of the body 12 of the sprocket tip 10 at a location of the void 16, 16a, 16b is 10%-50% of a thickness ($t_b$) of the body 12 at the circumferential end faces 14a, 14b away from the void 16, 16a, 16b. The thickness ($t_a$) is measured at the maximum depth of the void 16, 16a, 16b. The thickness ($t_a$) of the body 12, 112 at the void 16, 16a, 16b can be selected to determine any degree of wear experienced by the sprocket tip 10.

A depth (d) of the void 16, 16a, 16b can be selected to correspond to a predetermined amount of wear of the engagement surfaces that is acceptable to ensure the sprocket assembly will continue to operate and not malfunction or fail. In other words, the void 16, 16a, 16b characteristics are selected to allow for an acceptable degree of wear to the circumferential end faces 14a, 14b of the body 12.

In one embodiment, the sprocket tip 10 is formed as two identical sprocket tip halves 12, 112, and each sprocket tip half 12, 112 partially forms the void 16, 16a, 16b. Only one of the sprocket tip halves 12 is shown in more detail in FIG. 3, however one of ordinary skill in the art would understand that the corresponding other sprocket tip half 112 would include identical features illustrated in FIG. 3 with respect to the sprocket tip half 12. Each sprocket tip half 12, 112 also partially defines the channel 11.

A method for detecting a wear condition of a sprocket tip 10 is disclosed. The method includes providing a sprocket tip 10 including the features described herein. The method includes monitoring the engagement face of the sprocket tip 10. The method includes replacing the at least one sprocket tip 10 when the engagement face of the at least one sprocket tip 10 exposes a void 16, 16a, 16b. Monitoring the engagement face of the sprocket tip 10 can be performed by personnel or can be carried out via a semi-automated system.

The method further includes providing a sensor 30 arranged adjacent to the sprocket tip 10. The method further includes generating a signal when the sensor 30 detects the void 16, 16a, 16b is exposed. The method further comprises replacing the sprocket tip 10 with a replacement sprocket tip after the void 16, 16a, 16b is exposed.

Personnel can be alerted by the signal and then manually replace the worn sprocket tip 10 with a new, non-worn sprocket tip. This method and configuration provides an early indicator or warning regarding the wear condition of the sprocket tips 10 and avoids sprocket tips 10 being worn down to a state in which the sprocket tips 10 might shatter, crack, or otherwise break, which can cause catastrophic failure as well as damaging the traction system.

As shown in FIG. 4, the void 16b can be filled with a marker 17. The term marker is used herein to refer to any type of filling or material that is arranged within the void. The marker 17 can consist of a soft, marking material, such as a dyed wax. Alternatively, the marker 17 can be an alternately colored portion from a color of the remainder of the sprocket tip 10. The marker 17 provides a visual indicator to personnel or a sensor such that when the sprocket tip 10 is worn down, the differently colored marker 17 becomes visual and is easily identifiable.

Figure 5D:
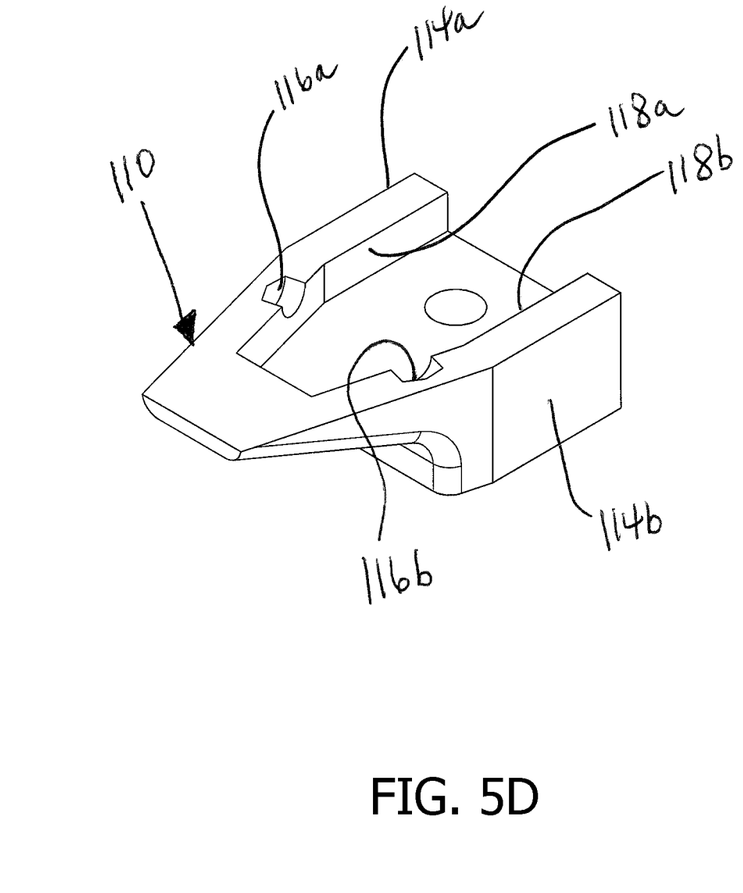

As shown in more detail in FIG. 5D, an alternative sprocket tip 110 (attached to sprocket 105) is disclosed that includes circumferential end faces 114a, 114b, internal faces 118a, 118b, and voids 116a, 116b defined on the undersides of the circumferential end faces 114a, 114b. The embodiment of FIGS. 5A-5D is otherwise identical to the embodiment of FIGS. 1-4 except the traction system is a chain link 150 instead of a cable 50.

It will be appreciated by those skilled in the art that changes can be made to the embodiments of the invention described above without departing from the broad inventive concepts thereof.

It is also understood that various portions of the invention can be used alone or in combination and that not all of the components are required for any particular application. It is therefore understood that this invention is not limited to the particular embodiments disclosed, but it is intended to cover modifications within the spirit and scope of the present invention.

The invention claimed is:

1. A sprocket tip for a sprocket assembly, the sprocket tip comprising:
    a body defining at least one circumferential end face defining an engagement face configured to drivingly engage a traction system, and
    a void defined on an internal face of the body positioned on an underside of the at least one circumferential end face.

2. The sprocket tip of claim 1, wherein in a worn condition of the sprocket tip, the engagement face is worn down to expose the void.

3. A sprocket assembly comprising the sprocket tip of claim 1, the sprocket assembly further comprising a sensor arranged adjacent to the sprocket tip, and the sensor is configured to detect the void being exposed through the engagement face.

4. The sprocket tip of claim 1, wherein a thickness of the body at a location of the void is 10%-50% of a thickness of the at least one circumferential end face at a location away from the void.

5. A sprocket tin for a sprocket assembly, the sprocket tip comprising:
    a body defining at least one circumferential end face defining an engagement face configured to drivingly engage a traction system, and
    a void defined on an internal face of the body positioned on an underside of the at least one circumferential end face, wherein the body is formed as two identical sprocket tip halves, and each sprocket tip half of the sprocket tip halves partially defines the void.

6. The sprocket tip of claim 1, wherein the sprocket tip is connected to a sprocket arm.

7. The sprocket tip of claim 1, wherein the sprocket tip defines a channel configured to receive a traction element.

8. The sprocket tip of claim 7, wherein the void is positioned radially inward from the channel.

9. The sprocket tip of claim 1, wherein the void has a tapered cylindrical profile.

10. The sprocket tip of claim 1, wherein the void is filled with a marker.

11. The sprocket tip of claim 10, wherein the marker is a different color than the body.

12. A method of detecting a wear condition of a sprocket tip, the method comprising:
    providing at least one sprocket tip including:
        a body defining at least one circumferential end face defining an engagement face configured to drivingly engage a traction system, and
        a void defined on an internal face of the body on an underside of the at least one circumferential end face;
    repeatedly engaging the at least one sprocket tip against the traction system to drive the traction system;
    monitoring the engagement face of the at least one sprocket tip; and
    replacing the at least one sprocket tip when the engagement face of the at least one sprocket tip exposes the void.

13. The method of claim 12, further comprising providing a sensor positioned adjacent to the at least one sprocket tip.

14. The method of claim 13, further comprising generating a signal via the sensor when the void is exposed.

15. The method of claim 12, wherein a thickness of the body at a location of the void is 10%-50% of a thickness of the at least one circumferential end face in a location away from the void.

16. The method of claim 12, wherein the sprocket tip defines a channel configured to receive a traction element.

17. The method of claim 12, wherein the at least one sprocket tip is formed as two identical sprocket tip halves, and each sprocket tip half of the sprocket tip halves partially defines the void.

18. The method of claim 12, further comprising filling the void with a marker.

19. The method of claim 12, wherein the traction system includes a cable with a plurality of conveying discs or a chain link with a plurality of conveying discs.

* * * * *

UNITED STATES PATENT AND TRADEMARK OFFICE
CERTIFICATE OF CORRECTION

PATENT NO. : 10,640,299 B1
APPLICATION NO. : 16/386713
DATED : May 5, 2020
INVENTOR(S) : John Stephen Szazdi, Jr.

Page 1 of 1

It is certified that error appears in the above-identified patent and that said Letters Patent is hereby corrected as shown below:

In the Claims

In Claim 5 at Column 5, Line 29, delete the word "tin", and insert --tip--.

Signed and Sealed this
Fourteenth Day of July, 2020

Andrei Iancu
*Director of the United States Patent and Trademark Office*